United States Patent [19]

Winter, III

[11] 4,134,734
[45] Jan. 16, 1979

[54] DETERGENT ALKYLATION REACTOR

[75] Inventor: George R. Winter, III, Mt. Prospect, Ill.

[73] Assignee: UOP Inc., Des Plaines, Ill.

[21] Appl. No.: 858,040

[22] Filed: Dec. 6, 1977

[51] Int. Cl.² .............................. B01J 8/00; B01J 1/00; C07C 3/12

[52] U.S. Cl. .............................. 422/224; 260/683.48; 261/77; 261/124; 366/73; 422/197

[58] Field of Search .................. 23/283, 285, 288 E, 23/288 R; 261/77, 124; 260/683.48; 366/167, 173, 174

[56] References Cited

U.S. PATENT DOCUMENTS

| 1,191,614 | 7/1916 | Reimers | 261/124 |
| 1,747,687 | 2/1930 | Wheeler | 261/124 X |
| 2,386,681 | 10/1945 | Hadden | 260/683.48 UX |
| 3,133,128 | 5/1964 | McDonald | 260/683.58 |
| 3,212,860 | 10/1965 | Vernon | 260/683.48 X |
| 3,213,157 | 10/1965 | Hays et al. | 260/683.48 |
| 3,275,565 | 9/1966 | Sailors | 260/683.48 X |
| 3,435,092 | 3/1969 | Hutson, Jr. et al. | 260/683.43 |
| 3,867,103 | 2/1975 | Boney et al. | 23/288 E |

Primary Examiner—Morris O. Wolk
Assistant Examiner—Roger F. Phillips
Attorney, Agent, or Firm—James R. Hoatson, Jr.; John F. Spears, Jr.; William H. Page II

[57] ABSTRACT

A unitary reactor system for the alkylation of benzene with olefins. The hydrocarbon reactants are sprayed horizontally from a plurality of openings in a number of vertical conduits which extend upward into a lower portion of the vessel. The conduits are surrounded by a vertical reaction tube having a circular catalyst inlet at its bottom end and which contains a mixing means located above the conduits. A hydrocarbon phase is retained in the upper portion of the vessel and an acid phase surrounds the reaction tube, with the interface of the two liquid phases being maintained above the open upper end of the reaction tube.

3 Claims, 2 Drawing Figures

DETERGENT ALKYLATION REACTOR

FIELD OF THE INVENTION

The invention relates to a unitary apparatus for use in an aromatic hydrocarbon alkylation process. The invention more specifically relates to a unitary reaction system for the HF-catalyzed alkylation of benzene to form linear alkyl benzenes used as detergent precursors. References concerned with similar subject matter may be found, for instance, in Classes 23-288 and 260-671.

PRIOR ART

Various aspects of processes for the production of detergent grade alkyl benzenes by the hydrogen fluoride-catalyzed alkylation of benzene are described in U.S. Pat. Nos. 3,426,092 (Cl. 260-671); 3,494,971; 3,501,543 (Cl. 260-674); 3,830,865 (Cl. 260-671R) and 3,950,448 (Cl. 260-671B). As shown by these references the reactants are often admixed and then passed into a reaction zone wherein they are contacted by the hydrogen fluoride alkylation catalyst. It is believed that heretofore the reaction products and acid have been subsequently passed into an external settling zone wherein the hydrogen fluoride-hydrocarbon emulsion formed in the reaction zone was allowed to separate into two liquid phases.

Various reactor configurations have been presented for use in the hydrogen fluoride-catalyzed alkylation of isoparaffins with short chain olefins to produce motor fuel blending stocks. Those believed to be possibly pertinent to the subject apparatus are shown in U.S. Pat. Nos. 3,133,128 (Cl. 260-683.58); 3,169,152 (Cl. 260-683.48); FIG. 3 of 3,435,092 (Cl. 260-683.43), and 3,501,536 (Cl. 260-683.48).

BRIEF SUMMARY OF THE INVENTION

The invention provides a unitary reaction system for the alkylation of aromatic hydrocarbons. The invention may be broadly characterized as comprising a vertically aligned outer vessel divided into upper and lower portions at the vertical midpoint of its internal volume; a vertically aligned cylindrical reaction tube centrally located within the lower portion of the vessel which has an open upper end and a lower end which is secured to the lower inner surface of the vessel, with a liquid passageway being provided at the lower end of the reaction tube to allow catalytic hydrogen fluoride to enter the reaction tube. A plurality of vertically aligned reactant distribution conduits extend upward into the reaction tube for at least one-third the height of the reaction tube. These conduits are each provided with a plurality of reactant outlets through which a mixture comprising the aromatic hydrocarbon and the olefin is sprayed into the cylindrical volume inside the reaction tube.

The admixture of the hydrocarbon reactants and the hydrogen fluoride initiates the alkylation of the aromatic hydrocarbon and causes the formation of an acid-hydrocarbon emulsion. This emulsion, due to its lower density compared to hydrogen fluoride, rises through the reaction tube and is further admixed by passage through a mixing device located in the reaction tube. A fresh hydrogen fluoride stream is passed into the vessel and a hydrogen fluoride stream is removed for regeneration through conduits communicating with the lower portion of the vessel. A hydrocarbon/hydrogen fluoride interface is held at an intermediate vertical point by an interface detection means which is interconnected with a flow control valve on the conduit supplying the fresh hydrogen fluoride. A stream of the hydrocarbon phase is removed from the upper portion of the vessel through a third liquid transfer conduit for passage into a fractionation zone or a second reaction zone.

DETAILED DESCRIPTION

Figure 2:
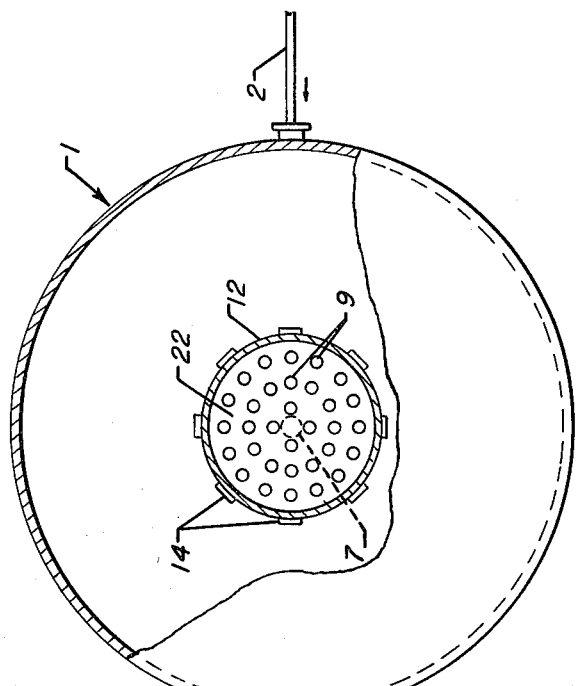
FIG. 2 is a cross-section of the apparatus shown in FIG. 1 taken along line 2—2 looking downward.

Homogeneous catalysts are used in several processes to promote the reaction of hydrocarbons. One example is the commercially performed alkylation of benzene with ethylene to form the feedstock used to produce styrene. Aluminum chloride is used in this process. Another example is the production of tolyaldehyde by the reaction of toluene and carbon monoxide in which a mixture of hydrogen fluoride and boron trifluoride is used as the catalyst. The liquid phase catalyst in some processes may be sulfuric acid, as in the reaction of short chain isoparaffins and olefins to form motor fuel. Liquid hydrogen fluoride may alternatively be used to perform this same reaction and produce "motor alkylate."

One of the more important hydrogen fluoride-catalyzed reactions is the production of detergent grade alkylated aromatic hydrocarbons. This "detergent alkylate" is formed by the reaction of an aromatic hydrocarbon with an olefinic hydrocarbon having from about 6 to 20 carbon atoms per molecule. A better quality detergent precursor normally results from the use of olefinic hydrocarbons having from 10 to 15 carbon atoms per molecule. The preferred aromatic hydrocarbon is benzene, but other hydrocarbons including toluene, the xylenes and ethylbenzene may also be alkylated in this same manner. To provide a frame of reference for the subject invention, the following description will be cast mainly in terms of this one reaction. This is not intended to restrict the inventive concept solely to this one process.

The detergents produced from alkylated hydrocarbons are classified either as "soft" if they are biodegradable with relative ease or as "hard" if they are relatively non-biodegradable. Hard detergents result from the use of propylene tetramer produced in a catalytic condensation process as the olefinic hydrocarbon. As the use of soft detergents is becoming predominant, the subject invention will be discussed primarily in terms of soft detergent production.

Soft detergents are the result of using a long-chain normal mono-olefin as the olefinic reactant. The preferred method of producing these olefins is by the dehydrogenation of the corresponding paraffins. Dehydrogenation processes typically do not provide a 100 percent conversion of the paraffins to olefins, and the separation of olefins and paraffins of the same carbon number is relatively expensive. It is therefore a common practice to utilize the unseparated paraffin/olefin effluent stream of a dehydrogenation process as the olefin-containing feed stream charged to the alkylation zone. The non-reactive paraffins pass through the alkylation process in the various hydrocarbon phase streams and are eventually separated from the alkylate by fractionation. The integration of dehydrogenation and alkylation zones in this manner is described in U.S. Pat. Nos. 3,413,373; 3,484,498 and 3,494,971 (all Cl. 260-671).

Reactions which involve olefinic hydrocarbons and are catalyzed by hydrogen fluoride usually proceed at a very fast rate. To reduce the amount of olefin polymerization and to promote the production of a monoalkylated aromatic product, the reactants are normally subjected to vigorous mixing and agitation at the initial contacting of the olefinic reactant with the hydrogen fluoride and aromatic reactant. The desired result is a uniform dispersion and intimate contacting of the hydrocarbon and hydrogen fluoride phases and the avoidance of the formation of localized high temperatures or high hydrogen fluoride concentrations. The initial contacting has been done in a number of different ways in the prior art. For instance, the olefinic hydrocarbons have been sprayed into a mixture of hydrogen fluoride and hydrocarbons through nozzles and have been released into eductors as high velocity streams which cause the eduction and admixture of the hydrogen fluoride.

Processes which utilize hydrogen fluoride must be designed and operated with a great deal of care to avoid injuries to plant personnel and environmental damage. For these reasons it is desirable to design such processes with a minimum number of potential locations for hydrogen fluoride leakage. It is therefore desired to minimize the number of transfer lines, connections, seals, valves and vessels required in the process. It is also desired to provide the requisite intense mixing and contact time and to provide a means of allowing the hydrocarbon-hydrogen fluoride mixture to separate into the respective liquid phases.

It is an objective to provide a unitary apparatus useful for performing hydrocarbon reactions which are catalyzed by a homogeneous catalyst which is relatively immiscible in the hydrocarbon reactants or the reaction product. It is another objective of the invention to provide a unitary reaction and liquid phase separation apparatus for use with homogeneous catalysts. It is yet another objective to provide a unitary apparatus for the hydrogen fluoride-catalyzed alkylation of aromatic hydrocarbons.

Figure 1:
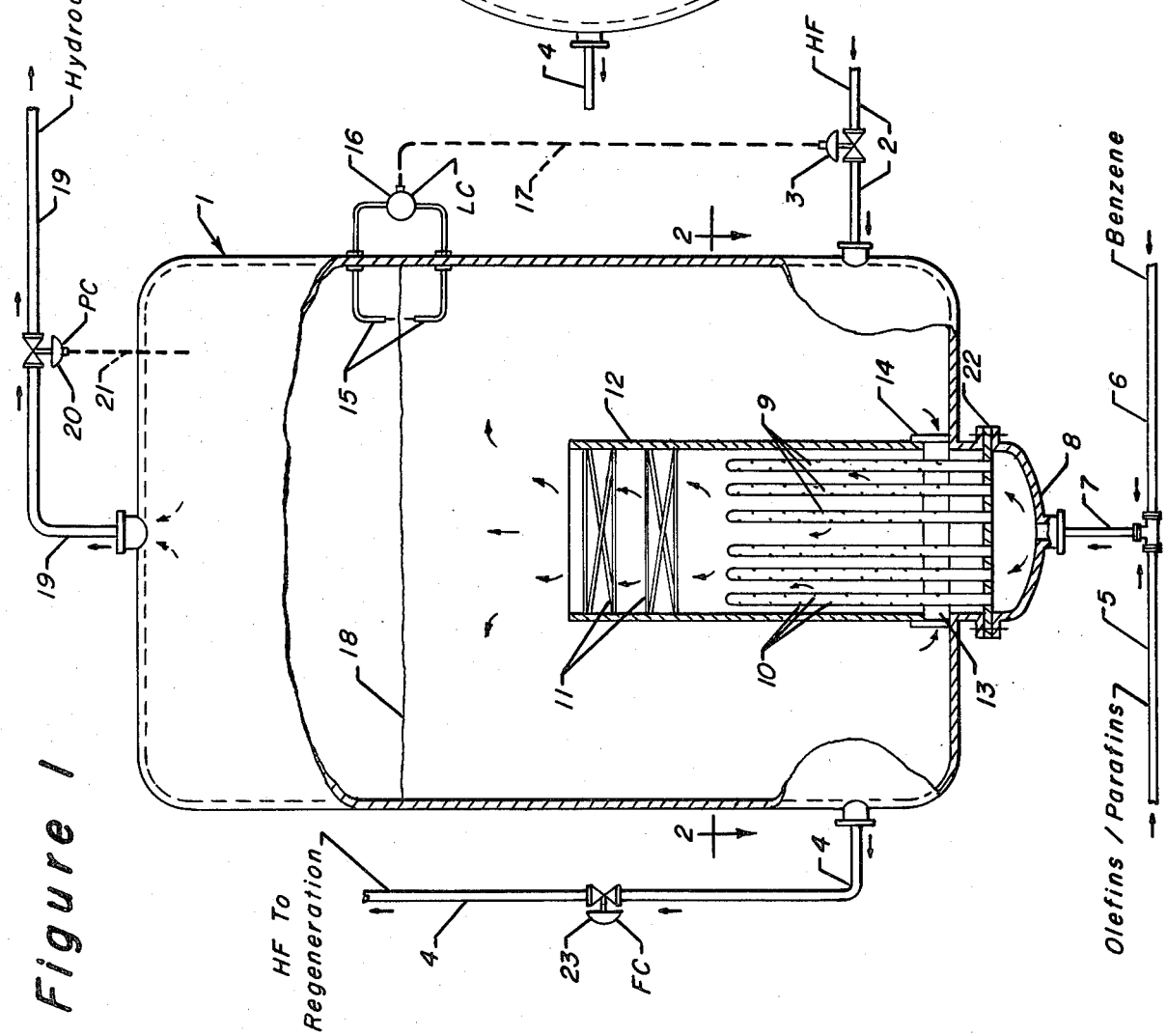
FIG. 1 is a cross-section of a unitary reaction and separation system constructed according to the preferred embodiment of the invention, with the cross-section being along a vertical plane at the central axis of the system.

The apparatus shown in the Drawing represents the preferred embodiment of the invention. Referring now to FIG. 1, a stream of hydrogen fluoride which has been cooled in a means not shown is fed into the lower portion of the vertically aligned outer vessel 1 through transfer conduit 2. The rate of flow of this stream is regulated by a valve 3 in response to a signal carried by means 17. For descriptive purposes the vessel is divided into upper and lower portions by a horizontal plane passing through the vertical midpoint of the internal volume of the vessel. The entering hydrogen fluoride, commonly referred to as the acid or the acid phase, enters the lower portion of the internal volume of the vessel.

A hydrogen fluoride continuous phase is maintained in the lower portion of the vessel, and a hydrocarbon continuous phase is maintained in the upper portion of the vessel. The level of the interface 18 between these two liquid phases is monitored by a liquid interface and signal generation means of customary construction. This means may have several different forms depending on the physical characteristic of the liquids which is being used to determine the level of the interface. For instance, there could be used a level gauge using a float having an average density between that of the two liquid phases. As an alternative the difference in the electrical or thermal conductivity of the two liquid phases can be used to determine the level of the interface. Preferably, one or more capacitance probes 15 are positioned within the vessel near the desired level for the interface. These probes are connected to the control element 16, which generates a signal representative of the instantaneous desired flow rate of the fresh hydrogen fluoride in line 2. The preferred vertical location for the liquid interface and signal generation means is at a point approximately intermediate the upper end of the reaction tube and the open inner end of the liquid transfer conduit 19.

Hydrogen fluoride is removed from the lower portion of the vessel through transfer conduit 4 at a constant rate regulated by a flow controller which activates valve 23. At least a portion of this acid is passed to a regeneration facility for the removal of acid-soluble oils. The regenerated hydrogen fluoride may be returned to the reaction system through line 2 or may be used in a different reaction zone as described herein. A second portion of the acid removed in line 4 may be cooled by heat exchange and returned to the vessel as needed to control the temperature of the reaction zone. Lines 2 and 4 may communicate with the internal volume of the vessel at the same or different elevations. The pressure within the vessel is monitored by a pressure controller through connecting means 21. The pressure controller operates valve 20 in transfer conduit 19. A hydrocarbon stream comprising the alkylated aromatic hydrocarbon product, excess aromatic hydrocarbon and any unreactive paraffins contained in the feed stream is removed in conduit 19. This stream may be passed into a second reaction zone or into a suitable fractionation zone operated in the customary manner.

A hydrocarbon-acid emulsion is formed in the lower portion of the vessel. A feed stream comprising olefins and paraffins from line 5 is admixed with a second feed stream comprising benzene from line 6. The resultant combined feed stream is passed into the vessel through the reactant transfer conduit 7. The feed stream enters the concave cover 8 at the bottom of the vessel and is then forced upward into a plurality of openings in the stationary head plate 22. The hydrocarbon reactants are thereby directed into the vertically aligned reactant distribution conduits 9. These conduits extend upward into a vertically aligned cylindrical reaction tube 12. This centrally located reaction tube is preferably concentric with the central vertical axis of the vessel. The reaction tube does not extend into the upper portion of the vessel, and can have a height of between one-quarter and one-third of the height of the internal volume of the vessel. The reactant distribution conduits extend upward into the reaction tube for at least one-third the height of the reaction tube, but preferably for less than three-quarters of the reaction tube's height. As used herein, references to the height of the reaction tube are intended to indicate the vertical distance between the open upper end of the reaction tube and the acid passageway provided at the lower end of the reaction tube.

The preferred structure of the reaction tube is a right angle cylinder which is supported above the horizontal inner surface of the vessel by several vertical bars 14. Only two of these supports are shown, but several others would be provided to stabilize the reaction tube. This provides a substantially unobstructed cylindrical liquid passage means which allows the denser hydrogen fluoride phase retained in the vessel to enter the lower end of the reaction tube. As an alternative a large number of sizable holes, such as from 2 to 6 inches in diameter may be spaced around the entire circumference of the tube in a circular pattern. Two or more rows of holes may be provided. Another alternative would be a number of rectangular notches cut into the lower end of the reaction tube, with each notch being at least 6 inches in height and 2 inches wide. The remaining portions of the tube may then be utilized as the support bars 14.

The reactant distribution conduits may have a diameter of from about one-half to about two inches. They are preferably spaced uniformly across the horizontal cross-section of the reaction tube. The reaction distribution conduits preferably have a length to diameter ratio above 20:1 when the length of the conduits is considered to be that portion of their total height which is within the reaction tube and located above the liquid passage means 13. Each reactant distribution conduit is to have at least 10 reactant outlets 10 spread along the height of the conduit. These outlets may be holes drilled in the wall of the conduit. The outlets may direct the reactants horizontally, but it is preferred that each outlet has an upward inclination to aid the vertical movement of the liquids located in the reaction tube. The size and total number of the outlets are to be coordinated with the flow rate of the combined feed stream to provide a high velocity reactant stream at each outlet. Preferably, each outlet will have a diameter of from about 1/16 to ¼ inch. Nozzles, of which various types are known in the art, may also be used as the reactant outlets.

A liquid mixing means 11 is located within the reaction tube at a location above the upper ends of the reactant distribution conduits. This is preferably a static mixing means having no moving parts and which effects the admixture of the acid and hydrocarbon phases due to their upward movement. The mixing means may be of a customary type known to those skilled in the art. It should offer a low resistance to liquid flow since upward liquid movement within the reaction tube is desired and is not assisted by any mechanical means. The liquid mixing means preferably comprises two or more separate beds of a static mixing device formed by large numbers of helixes joined together in layers. These devices are available commercially. Horizontal perforated plates are an alternative mixing means.

The reactants emerge from the distribution conduits and form an emulsion upon being mixed with the hydrogen fluoride. This emulsion is maintained throughout the reaction tube by the combined agitative action of the vertically staggered reactant outlets and the mixing means. Being less dense than the surrounding acid phase, the emulsion rises through the reaction tube. The emulsion emerges from the reaction tube and slowly begins to separate into the less dense hydrocarbon phase and the acid phase. The large internal volume of the vessel allows a highly effective separation to be achieved without the use of a separate vessel.

FIG. 2 is a horizontal cross-section, that is one taken on a horizontal plane, of the apparatus of FIG. 1. This view is that seen looking downward toward the reactant inlet conduit 7, which is located under the horizontal head plate. The cylindrical outer wall of the vessel 1 encloses the lower portion of the apparatus. The positioning of the vertical support bars 14 around the base of the reaction tube 12 may be more clearly seen in this view. Also apparent is the even location of the reactant distribution conduits 9 within the reaction tube in order to provide uniform admixture of the reactants and the catalyst. The ratio of the inner diameter of the vessel to the inner diameter of the reaction tube is to be within the range of from 7:1 to 3:1. The inlet conduit 2 is preferably located on the opposite side of the vessel from the outlet conduit 4 to maximize intermixing of the entering hydrogen fluoride with the inventory of the vessel prior to its withdrawal.

The apparatus must be constructed according to recognized standards to withstand reaction-promoting conditions which correspond to the particular reaction being performed. For the production of detergent alkylate, alkylation-promoting conditions include a pressure sufficient to maintain the reactants and HF in a liquid phase. A general range of operating pressures is from about 2 to 41 atmospheres absolute. The temperature range covered by this specific set of conditions is from about $-20°$ C. to about $95°$ C., but the reaction is preferably conducted at a temperature of from $15°$ C. to $50°$ C. The volumetric ratio of HF to the total amount of hydrocarbons entering a first reaction zone should be maintained within the broad range of from about 0.2:1.0 to about 10:1. A preferred range for this ratio is from 1.0:1.0 to 2.5:1.0. To lessen the production of polyalkylated benzenes and to reduce the amount of olefin polymerization in the first reaction zone, the mole ratio of benzene to the mono-olefin at the point of initial olefin-acid contact is maintained above 1.0:1.0, but preferably below 10.0:1.0. A range including typical commercial ratios is from 3.0:1.0 to about 8.0:1.0.

The hydrocarbon phase removed from the initial reaction zone is preferably passed into a second reaction zone which may also utilize the inventive concept. The alkylation-promoting conditions will be adjusted to a limited extent for use in the second and any subsequent reaction zones. For instance, since essentially all of the olefin is normally consumed in the first reaction zone, the hydrocarbon stream fed to a second reaction zone is substantially free of olefins. There is therefore no benzene to olefin ratio to be specified. The same pressure range may be used in the second reaction zone as in the first reaction zone, but a higher temperature is preferred. This higher temperature should be at least 6 to 10 Centigrade degrees above that used in the first reaction zone. All temperatures specified herein are intended to refer to the average temperature of the liquid stream entering the respective reaction zone.

The acid-catalyst ratio maintained in the second reaction zone will normally be slightly lower, and a typical ratio is about 1.0:1.0. The purity of acid used in the second step will, however, be higher. This is preferred because of the greater effectiveness of higher purity acid for the treatment of the alkylate. This treatment consists of the defluorination of the alkylate product and the extraction of naphthalenes and anthracenes. A higher acid purity is obtained by passing newly regenerated acid directly into the second reaction zone. The acid used in the first reaction zone is withdrawn from the settling zone associated with the second reaction zone and therefore contains a higher concentration of high molecular weight hydrocarbonaceous compounds referred to as tar or acid-soluble oil. The acid used in the first reaction zone may be from about 85–92 wt.% HF and will typically be about 90 wt.% HF. The acid used in the second reaction zone preferably contains more than 90 wt.% HF and is typically about 93–94 wt.% HF. The residence time of the hydrocarbon phase in the upper portion of the vessel should be in excess of 5 minutes but less than 25 minutes in both vessels.

Those skilled in the art are familiar with the regeneration of HF acid used as a catalyst. Information about the apparatus and conditions utilized for this operation is contained in the previously cited patents and also in U.S. Pat. Nos. 3,721,720 and 3,975,164. The regeneration operation is normally accomplished by stripping the acid under conditions sufficient to decompose alkyl-fluorides and to produce an overhead vapor stream containing HF and the stripping media. Benzene available within the process is a suitable stripping media. The overhead vapors of the stripping column are condensed to form an acid phase and a benzene phase containing dissolved HF. The acid phase is withdrawn as the regenerated HF stream. In a more limited embodiment of the invention the net benzene phase is charged to the first reaction zone in admixture with the other hydrocarbon streams.

The previously cited patents also described fractionation systems and conditions suitable as an effective separation zone for the recovery of the product alkylate from the hydrocarbon stream removed from the second reaction zone. In one of these systems the effluent stream is passed into an upper portion of a first fractionation column which is operated under conditions effective to strip hydrogen fluoride from the entering hydrocarbonaceous liquid. The resultant overhead stream of this column comprises hydrogen fluoride and some benzene which may be passed into the overhead system of the fractionation column used for the regeneration of the HF. The bottoms stream of this HF stripper is passed into a second fractionation column referred to as a benzene column. This column is operated under conditions effective to cause the division of the entering hydrocarbons into a high purity benzene stream which is removed as the overhead liquid and a bottoms stream containing the alkylate product. This bottoms stream is passed into a third fractionation column referred to as a paraffin column. The non-reactive paraffins are removed as an overhead liquid stream. The bottoms stream of the third fractionation column comprises the product alkylate and any higher molecular weight hydrocarbons formed by side reactions. This bottoms stream is passed into a fourth fractionation column which produces a high purity overhead stream containing the detergent alkylate. A bottoms stream comprising polymerized olefins and polyalkylated benzenes is removed for disposal. The third and the fourth fractionation columns are normally operated at a subatmospheric pressure. An alternative method of performing this separation is disclosed in U.S. Pat. No. 3,950,448. Product recovery or separation zones suitable for other products are known in the art and may also be of customary design.

I claim as my invention:

1. A unitary contacting and settling system for the reaction of hydrocarbons using a homogeneous catalyst which comprises:
   (a) a vertically aligned cylindrical vessel which has a cylindrical internal volume and an internal surface, the vessel being divided into upper and lower portions at a horizontal plane passing through the vertical midpoint of the internal volume of the vessel;
   (b) a vertically aligned cylindrical reaction tube having an internal volume and which is concentric with the vertical central axis of the vessel and located in the lower portion of the vessel, with the reaction tube having an open upper end and a lower end which is secured to the internal surface of the vessel, and with a liquid passage means providing communication between the internal volume of the reaction tube and the lower portion of the internal volume of the vessel which is external to the reaction tube being located in a circular pattern around the lower end of the reaction tube;
   (c) a plurality of vertically aligned reactant distribution conduits extending upward into the reaction tube for at least one-third the height of the reaction tube, each of the reactant distribution conduits having a plurality of reactant outlets located at various elevations above the liquid passage means, the conduits communicating with at least one reactant conduit located outside the vessel;
   (d) a liquid mixing means located within the reaction tube above the reactant distribution conduits;
   (e) a first liquid transfer conduit communicating with the internal volume of the vessel at a point below the upper end of the reaction tube;
   (f) a second liquid transfer conduit communicating with the internal volume of the vessel at a point below the upper end of the reaction tube; and,
   (g) a third liquid transfer conduit communicating with the internal volume of the vessel at a point within the upper portion of the vessel.

2. The system of claim 1 wherein the ratio of the diameter of the vessel to the diameter of the reaction tube is within the range of from 7:1 to 3:1.

3. The system of claim 2 wherein a liquid interface detection and signal generation means communicates with the internal volume of the vessel at a point approximately intermediate the upper end of the reaction tube and the open end of the third liquid transfer conduit, and said detection and signal generation means is interconnected with a flow control valve located in the first liquid transfer conduit by a signal transmission means.

* * * * *